March 23, 1971 R. ANGUE 3,572,403
PACKAGING MACHINE FOR PRODUCTS UNDER PRESSURE
Filed April 23, 1968 4 Sheets-Sheet 2
Fig. 3
Fig. 2
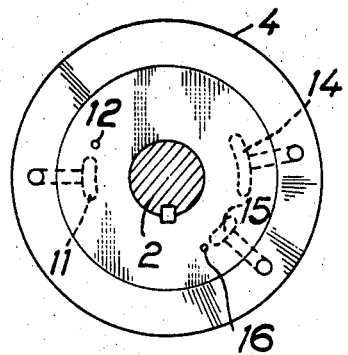
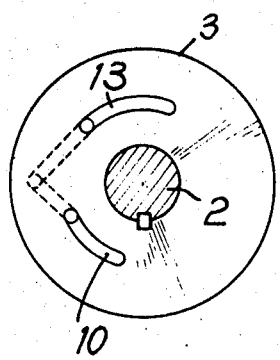
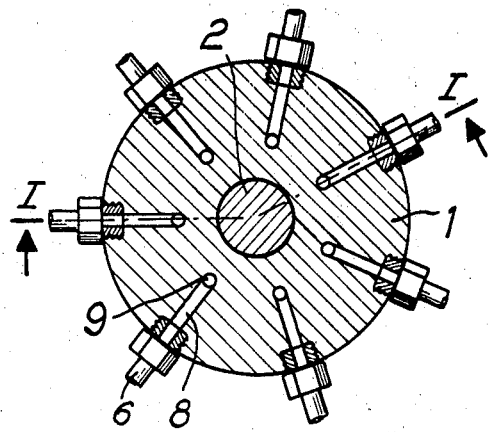
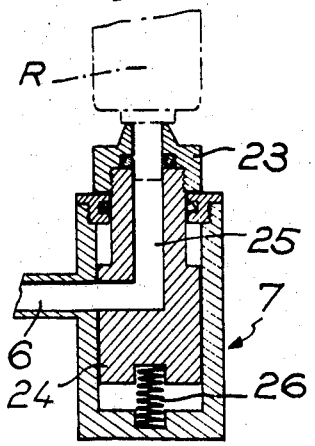
Fig. 4
Fig. 5
INVENTOR
ROBERT ANGUE
BY William W. Stokes
ATTORNEY March 23, 1971   R. ANGUE   3,572,403
PACKAGING MACHINE FOR PRODUCTS UNDER PRESSURE
Filed April 23, 1968   4 Sheets-Sheet 4

INVENTOR
ROBERT ANGUE
BY
ATTORNEY

United States Patent Office 3,572,403
Patented Mar. 23, 1971

3,572,403
PACKAGING MACHINE FOR PRODUCTS UNDER PRESSURE
Robert Angue, Antibes, France, assignor to A.T.A.D.-Approvisionnement - Transport - Aerien - Distribution, Paris, France
Filed Apr. 23, 1968, Ser. No. 723,546
Claims priority, application France, Apr. 24, 1967, 103,950
Int. Cl. B65b 31/00
U.S. Cl. 141—62    2 Claims

ABSTRACT OF THE DISCLOSURE

A device for sterilizing containers and packaging sterized products in the sterilized cointainers under pressure that includes a rotatable drum which cooperates with a fixed distributor body. Conduits through the distributor body connect the sterilizing means and product sources, including such devices as pressurized tanks and a vacuum pump, with registering ducts in the drum. These ducts which rotate with the drum register in succession with each of the supply conduits of the distributor body during a revolution of the drum. Conduits connected on one end with the ducts within the drums are connected on their other ends through valve means with the containers to be sterilized and filled. The containers are mounted on a device which rotates with the drum.

---

The present invention relates to an installation for packaging a sterile product, such as an edible cream, in closed containers into which a propelling gas is injected under pressure, the containers being themselves asepticized during the operation.

Since the product is sterilized it is necessary that the packaging takes place without external contamination, the containers and their sealing system being asepticized beforehand by the machine itself during the same cycle.

The invention accordingly has for its object a packaging machine which allows performing, without manipulation and in continuous fashion, the operations of asepticizing the containings and their valves, of filling the containers and of injecting a propelling gas thereinto, without a break in the bacteriological protection effect.

The present invention accordingly relates to a machine for packaging sterilized products in containers under pressure, characterized in that it includes a rotary drum which co-operates with at least one fixed distributor plate, which bears on its periphery container supporting and filling devices and which is formed with internal container feed ducts adapted to register in succession with ports formed in said distributor plate.

In a first form of embodiment, each container supporting and filling device is connected through a single conduit to one of the drum ducts and each internal drum duct is capable of registering successively with all the plate ports.

In a second form of embodiment of the invention, each container supporting and filling device is connected to the drum through at least two distinct conduits which can be caused to selectively communicate with the container and which are each connected to an internal drum duct. In this particular embodiment, the drum ducts are devised as at least two sets of separate ducts and the plate ports are likewise devised as at least two sets of ports, the ducts in one set thereof being each capable of registering in succession with all the plate ports of one of the sets thereof.

The description which follows with reference to the accompanying non-limitative exemplary drawings will give a clear understanding of how the invention can be carried into practice.

In the drawings:

FIG. 2 is a section along the line II—II of FIG. 1.

FIGS. 3 and 4 are underneath views of the two distributor plates of the packaging machine of FIG. 1.

FIG. 5 is a sectional view of the container supporting and filling device of the packaging machine of FIG. 1.

Figure 1:
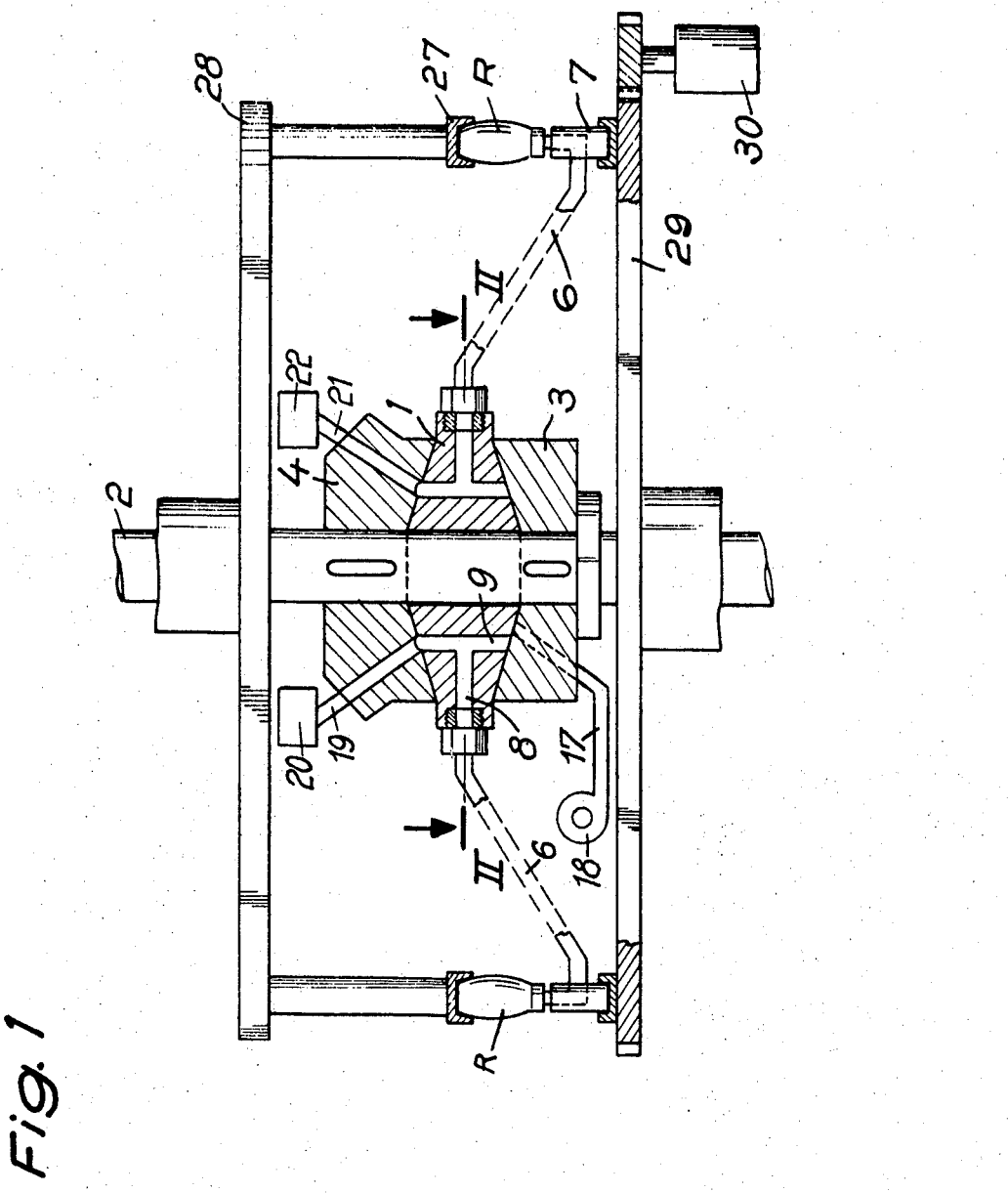
FIG. 1 is an external view of a packaging machine according to the invention, shown in part-section through the line I—I of FIG. 2.
Figure 6:
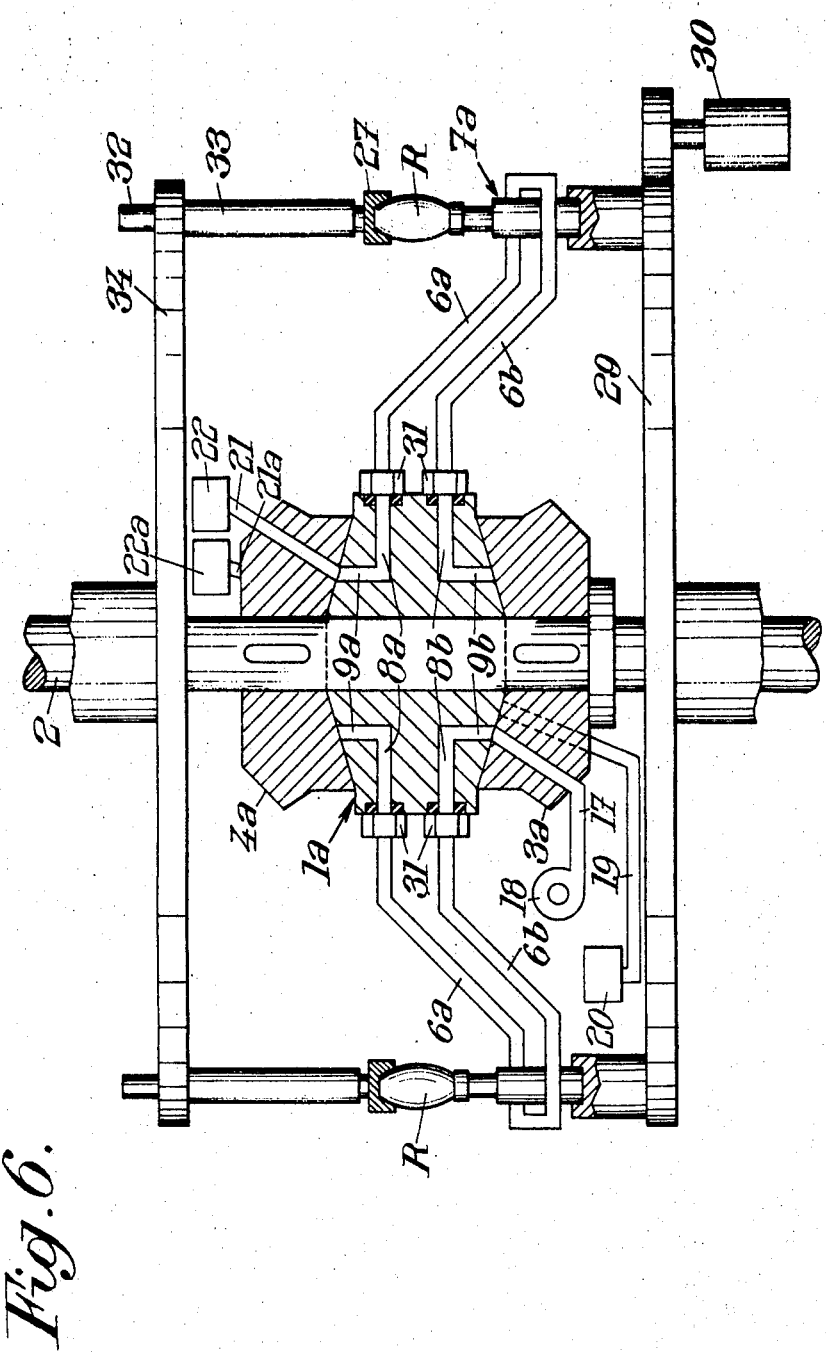
FIG. 6 is a part-sectional external view of an alternate embodiment of a packaging machine according to the invention.
Figure 7:
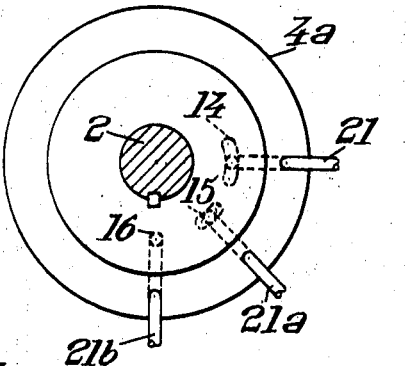
FIGS. 7 and 8 are top views of the two distributor plates of FIG. 6.
Figure 8:
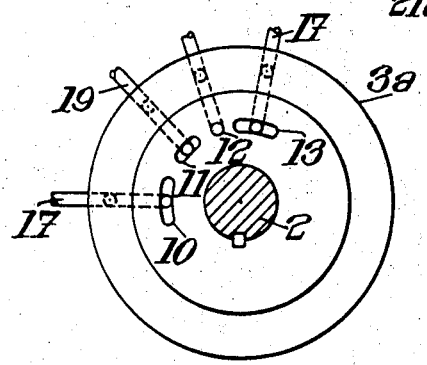

Referring first to FIGS. 1 through 5, the subject packaging machine of this invention shown thereon includes a rotary drum 1 rotating on an axis defined by a shaft 2 and positioned between two fixed distributor plates 3 and 4 with which it co-operates via conical surfaces. The drum 1 may be provided for example with seven external conduits 6, on the end of each of which is mounted a device 7 for supporting and filling the containers R to be filled.

The drum is formed with seven radial ducts 8 each of which debouches into a transverse duct 9, thereby placing the container R in communication with ports 10, 11, 12, 13, 14, 15 and 16 formed in distributor plates 3 and 4.

The port 10 is connected through a conduit 17 to a vacuum pump generally designated by reference numeral 18, the function of which is to evacuate the container. Duct 9 next registers with port 11, where, through a conduit 19, an asepticizer such as alcohol supplied by a metering pump is injected.

Since the quantity of sterilizing liquid injected is small, a vacuum continues for all practical purposes to prevail in the container. It is then necessary to introduce sterilized air through port 12 in order that the suction operation, which takes place via port 13 likewise connected to pump 18, should be performed under satisfactory conditions enabling practically all the asepticizer to be evacuated.

As the drum 1 continues its rotataion, duct 9 registers with port 14, through which a sterilized product such as edible cream delivered by a metering device 22 is injected via conduit 21.

Having thus received its dose of product, the container R has introduced thereinto, through the port 15, a propelling gas which has been filtered beforehand and flowed through a germicide radiation device.

Having been filled with its product and with propelling gas, the container R is then moved manually or automatically from its supporting device and sterilized air is injected through port 16 in order to eliminate all traces of product in the ducts and avoid backflow thereof into the suction circuit.

With the next phase of the cycle, a return to the loading station takes place and a fresh container is positioned on a device 7.

A device for supporting and filling a container includes a head 23 which receives the tip of the container sealing valve and which is fixed to the end of a piston 24 formed with a duct 25 therein which, when the piston is driven in against a countering spring 26, places the container in communication with conduit 6.

The containers are held driven into their supporting devices by mobile caps 27 carried by a rotating disc 28, the devices 7 being rigid with a rotary disc 29. Discs 28 and 29 are mounted for rotation, as a whole, around shaft 2, a motor 30 driving in rotation said disc.

From the foregoing description it will be appreciated that all the operations performed on a container R are effected through the same conduit 6.

It is desirable in certain cases for the functions not to be performed through the same conduit. Thus, should it be desired to avoid accidental mixing in the ducts and conduits of certain of the products utilized, recourse may be had to the embodiment portrayed in FIGS. 6 through 9.

In this constructional form, the packaging machine includes a rotary drum 1a rotating on an axis defined by shaft 2 and positioned between two fixed distributor plates 3a and 4a similar to the plates 3 and 4. The drum 1a is formed with two sets of radial ducts 8a, 8b debouching into axial ducts 9a, 9b respectively, whereby two sets of angled ducts are provided, each consisting of two ducts 8a and 9a (or 8b and 9b). The ducts 9a debouch from drum 1a on the side of plate 4a, while the ducts 9b debouch on the side of plate 3a.

The axial ducts in each set debouch on a common circle centered upon the axis of shaft 2 whereby to enable them to severally register with the feed ports formed in the associated plate, which ports are themselves formed on a common radius.

The ports formed on any one plate correspond to products which may if necessary be mixed without major drawbacks. Thus, the plate 3a is formed with ports 10, 11, 12, 13 identical to those of FIGS. 2 and 3 and the plate 4a is formed with ports 14, 15, 16 identical to those of FIGS. 2 and 3.

On plate 3a, the port 10 is interconnected via conduit 17 with vacuum pump 18, port 11 via conduit 19 with the asepticizing fluid metering pump 20, port 12 with a source of sterilized air, and port 11 via the same conduit 17 with vacuum pump 18.

On plate 4a, port 14 is interconnected via conduit 21 with a sterilized product metering device 22, port 15 via a conduit 21a with a reservoir 22a of sterilized propelling gas under pressure, and port 16 via a conduit 21b with a source of sterilized air under pressure.

The ducts 9a, 9b of drum 1a are caused to register in succession with the ports in the corresponding plate 3a or 4a without any duct 9a being associated to any of the substances or any of the functions of a duct 9b, and vice versa. It will thus readily be understood that the product to be packaged (issuing from metering device 22) and the propelling gas (issuing from source 22a) are at no time in contact with the duct 9b associated with the evacuating and asepticizing operation.

Each duct 8a, 8b is extended through union members 31 by conduits 6a and 6b respectively. The conduits 6a, 6b lead, in pairs, to the devices 7a for supporting and filling the containers R. A conduit 6a and a conduit 6b are so associated that, for each container R, the operation of injecting the product to be packaged follows immediately upon the sterilizing-fluid suction operation. On the basis of the mutual angular arrangement of the ports in plates 3a, 4a (see FIGS. 7 and 8), two conduits 6a, 6b leading to the same device 7a correspond to two aligned ducts 9a, 9b.

The devices 7a are mounted on the disc 29. During the processing operation, the containers R are restrained between the devices 7a and the caps 27 carried by the upwardly spring-loaded rods 32 sliding in sockets 33. The sockets 33 are fixed to a disc 34 likewise mounted on shaft 2.

Figure 9:
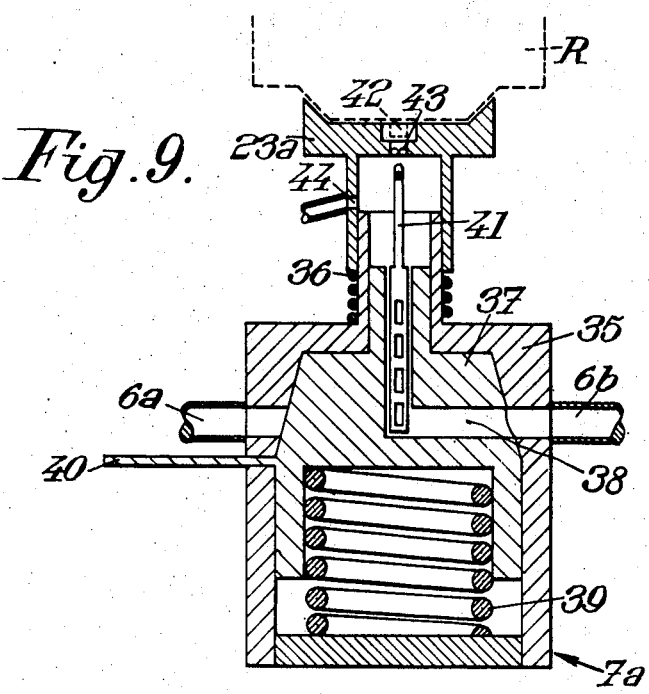
FIG. 9 is a sectional view of a supporting and filling device of the packaging machine of FIG. 6.

Reference to FIG. 9 shows that a device 7a for supporting and filling a container R includes:

A head 23a which receives the tip of the valve for sealing the container R,

A housing 35 which receives the head 23a slidingly thereon, with an interposed spring 36 for biasing the head 23a into its uppermost position, A rotatable member 37 fitting into housing 35, formed with an internal duct 38, urged into its uppermost position by a spring 39, and a rotatable by at least one lever 40 projecting from the housing 35 whereby to cause duct 38 to selectively register with ether of the two conduits 6a, 6b through the housing 35, And a hollow needle 41 having its lower part engaged into duct 38 and its upper end adapted to open the valve 42.

Obviously, it would be possible to provide either only one lever and equip the member 37 with a return spring, or two levers with possibly a spring-loaded protruding element to clamp the member 37 in its two active positions.

When the head 23a is in its bottom position the needle 41 opens valve 42 and places the container R in communication with duct 38.

Formed in head 23a is a discharge orifice 44 (to which further reference will be made hereinafter) to permit drainage at the end of the cycle. This orifice is masked by the housing 35 when the container is in position and rod 32 in its lowermost position (i.e. when head 23a is adjacent the housing) and is unmasked when head 23a recedes from the housing.

The seven rods 32 and the seven levers 40 may be actuated by fixed camming members (not shown), each of which coacts in succession either with all the rods or all the levers and the functions of which are respectively to shift the rods 32 vertically and rotate the members 37 between their two active positions.

The theory of operation of the packaging machine hereinbefore disclosed with reference to FIGS. 6 to 9 is as follows. The component systems 18, 20, 22, 22a are activated and the rotary compound including the two discs 29, 34, and the drum 1a, and the means for supporting the container R is set in rotation by the motor 30 as precedingly. A container is loaded on to the rotary compound at the loading station, either manually or automatically. The corresponding rod 32 is then driven in by its associated camming member, thereby restraining the container between the two discs. The head 23a is moved towards the housing and the needle 41 penetrates into the container, placing the latter in communication with the duct 38 in rotary member 37.

At the beginning of the cycle, rotary member 37 occupies a position wherein the container communicates with duct 9b via the corresponding conduit 6b. During the first four cycle phases, duct 9b registers in succession with ports 10, 11, 12, 13 for the operations of evacuating, injecting asepticizer, injecting sterilized gas, and evacuating once more.

It is to be noted that in both embodiments the container R is positioned upside down if the asepticizer is a liquid, in order to enable the same to flow under gravity towards the valve after it has been injected, thereby facilitating its subsequent suction. It will be manifest, however, that if the asepticizer is used in gaseous form the position of the container is immaterial.

After the second evacuating operation (through port 13), plate 3a will have terminated its functions in respect of the container being considered, and a fixed camming member either actuates or releases the lever 40 whereby to place the container in communication with the corresponding duct 9a through duct 38 and conduit 6a. Duct 9a then registers in succession with ports 14, 15 for the operations of injecting the sterilized product and the sterilized propelling gas.

Rod 32 then lifts responsively to its spring since the camming profile which held it driven in now recedes. The assembly formed by rod 32, container R and head 23a lifts in response to the springs, whereupon needle 41 emerges from the container and the latter is withdrawn from its support.

Duct 9a then registers with port 16, which blows sterilized gas under pressure into head 23a. This gas issues through the orifice 44, carrying with it possible residues of product out of the duct and head, thereby clearing the same. This draining operation may alternatively be performed at the unloading station.

An O-ring 43 is disposed in the head 23a, along the path of needle 41, so as to constrain the drainage products to pass through orifice 44 and prevent the ingress of non-sterilized air into head 23a.

The subsequent phases brings a return once more to the loading station and, at the same time as a fresh container is positioned on the rotary compound, rotating member 37, responsively to the lever 40 (which encounters a camming member), places duct 38 in communication with conduit 6b once more for a fresh cycle.

It will readily be understood from the description of the two forms of embodiment given hereinabove that the container stays in permanent communication with its filling head. Consequently, once the ascepticizing operation has been performed at the start of the cycle, the container is maintained under perfect conditions of bacteriological protection. It goes without saying that many changes and substitutions of parts may be made in both exemplary constructional forms hereinbefore described, without departing from the scope of the invention. By way of example, more than one container may be processed with the same conduit 6 or the same pair of conduits 6a, 6b Moreover, in the second embodiment disclosed, recourse may be had to a single plate embodying the ports 10 through 16 in a pattern of at least two circles of different radii, with the ducts 9a, 9b accordingly debouching on the same side of the drum 1a and being likewise arranged in a pattern of at least two circles.

What I claim is:

1. A machine for packaging sterile products in containers, under pressure, comprising in combination:
   at least one distributor body;
   a plurality of pressurized tanks and at least one vacuum pump, each of said tanks and said pump being extended by a duct which traverses said distributor body and ends by an open port on a surface area of said body;
   a drum rotatable relatively to the assembly of said body, said tanks and said pump, said drum being traversed by a plurality of ducts ending each one by at least one first port and by one second port, said first port being located on at least one surface area of said drum in frictioinal contact with said surface area of said body and in a position wherein it registers in succession with each of said open ports of said body during a revolution of said drum rotating relatively to said body;
   a device rotating with said drum and including a plurality of socket means, each socket means being adapted to receive one packaging container, each container being closed by a stopper provided with an opening controlled by a valve which is normally in its closed position;
   a plurality of duct means connecting the interior of each socket means with at least one of said second port, said last mentioned ducts rotating with said device;
   and valve-opening means, located in each socket means, adapted to open said valve in said stopper on the container carried by said socket means.

2. A machine according to claim 1, wherein said socket means are adapted to receive said containers positioned upside down.

References Cited
FOREIGN PATENTS

| 110,131 | 10/1875 | France | 141—113 |
| 819,950 | 11/1951 | Germany | 141—113 |
| 493,170 | 10/1938 | Great Britain | 141—113 |

HOUSTON S. BELL, JR., Primary Examiner

U.S. Cl. X.R.

141—101, 113